Dec. 3, 1940.  J. E. MARTIN ET AL  2,223,998
LAUNDRY APPARATUS
Filed June 5, 1935  6 Sheets-Sheet 1

Fig.1.

Inventors,
John E. Martin, Emil E. Hollander
Elvin E. Hollander
By H. LeVancey Gregory
Attorney Dec. 3, 1940.   J. E. MARTIN ET AL   2,223,998
LAUNDRY APPARATUS
Filed June 5, 1935   6 Sheets-Sheet 2

Inventors
John E. Martin
Emil E. Hollander
Elvin E. Hollander
By
Attorney

Dec. 3, 1940.  J. E. MARTIN ET AL  2,223,998
LAUNDRY APPARATUS
Filed June 5, 1935  6 Sheets-Sheet 5

INVENTOR
John E. Martin
Emil E. Hollander
BY Elvin E. Hollander
Darby & Darby
ATTORNEYS.

Patented Dec. 3, 1940

2,223,998

UNITED STATES PATENT OFFICE 2,223,998

LAUNDRY APPARATUS

John E. Martin and Emil E. Hollander, Newark, and Elvin E. Hollander, Arlington, N. J., assignors to Star Equipment Corporation, Bloomfield, N. J., a corporation of New Jersey Application June 5, 1935, Serial No. 25,076

7 Claims. (Cl. 68—23)

Our invention relates to improvements in laundry apparatus, and particularly to machines for cleaning and drying fabrics of all types.

An important object of our invention is to provide a power-operated container for fabrics and the like in which they are subjected to agitation in a cleaning fluid to remove the dirt, grease and the like therefrom, and which extracts the cleaning fluid from the fabrics to dry them while they are still in the machine.

Other objects and advantages will hereinafter appear.

For the purpose of illustrating our invention, an embodiment thereof is shown in the drawings, in which.

The apparatus of our invention is so constructed as to provide a machine into which soiled fabrics may be placed for cleaning and drying without removal therefrom. A container basket is loaded with the soiled fabrics, submerged in the cleaning fluid, and then subjected to an oscillatory movement to effectively force the cleaning fluid through the fabrics whereby the dirt and grease is completely removed therefrom. The container or basket construction is such that the fluid with the fabrics therein is given such a movement that the cleaning fluid is very effectively passed through the fabrics, or, in other words, the fabrics are so agitated within the body of the fluid that they are thoroughly cleaned in a minimum of time. At the end of the cleaning period the cleaning fluid is removed from the outer shell within which the basket is housed and then the basket is given a rapid rotary movement whereby the remaining fluid is completely ejected from the fabrics. Thus the machine is capable of both the cleaning and drying operations.

Referring to the drawings, our improved machine comprises a base plate 1 provided with the three tubular standards 2 spaced approximately one hundred twenty degrees apart. At 3 is a casing which houses the clutch mechanism and acts as an oil sump or well. The casing 3 is provided with three short arms 4 positioned over the standards 2. Each arm or extension 4 is provided with a caster 5 in which a hardened ball 6 is mounted on ball bearings, as is particularly clear in Fig. 1. Vertically slidable within the standards 2 are the hollow pistons 7 which rest upon heavy coil springs 9 seated upon discs 8 within the standards. It should be noted that these details of construction shown for only one standard are the same for all of the standards. The hollow piston 7 has a transverse wall intermediate its ends against which the upper end of the spring 9 bears and in which is mounted a hardened seat 10 for the supporting ball 6. Within the upper end of the piston and surrounding the caster support is a heavy ring of soft rubber 11.

The casing 3 is provided with a removable cover 12 which is formed into a vertical hollow standard at its center. Journalled in suitable bearings in this standard is a vertical drive shaft 13, to which is keyed a fluted collar 14' which serves to lock a central cylindrical housing 14 to this shaft. The housing 14 extends downwardly into four curved or concave portions 15 which have formed integral therewith the blades or vanes 16. These vanes 16 vary in cross sectional shape, as is clear from Figs. 10, 11 and 12. The radius of curvature of the sides of the vanes gradually increases from the center outwardly, as will be apparent from these detailed figures. This construction is of great importance in the cleaning action of the machine, since the fabrics when immersed in the cleaning solution are given a compound motion which has components radially of the basket and components circumferentially thereof so that in the oscillatory operation of the basket the fabrics are continuously moving through the fluid in a motion indicated by the arrows in Fig. 8. Some concept of the operation of this portion of the apparatus will be clear when it is noted that no matter how the fabrics are piled into the basket, as soon as it begins to oscillate they very quickly distribute themselves in balanced relation about the center of oscillation. In addition, the fabrics slowly travel around the basket and at the same time are continually travelling in a roughly circular path in substantially vertical planes, as has been indicated by the arrows in Fig. 3. The result is that the cleaning fluid is continually being forced through the interstices of the fabric, which is the most efficient way of removing dirt and grease therefrom. It is believed, although not offered as a limiting explanation, that this highly efficient cleaning operation is the result of the particular form of the vanes and the floating form of mounting for the basket. In other words, by reason of these features, the fluids are given such movements as to provide an efficient cleaning operation which may be carried out in the very minimum of time. For example, whereas with the best known machines today it normally takes from twenty minutes to an hour to thoroughly clean a batch of fabrics, the machine of this invention will completely clean them in less than fifteen minutes.

The central housing 14 which is rotatably supported by the shaft 13, as described above, is nested within the perforated basket or container 17 into which the fabrics are placed. This container is open at the top through which the fabrics are loaded into and removed therefrom. Secured to the cover member 12 around the periphery thereof is an upstanding casing or housing 18 which includes the basket and forms with the cover 12 a liquid-tight container. The upper end of the casing 18 is provided with a cover ring 19 hermetically sealed thereto and in turn is closed at its central opening by means of a cover 20 which is supported by means of a hinge, generally shown at 21. This cover is provided with a sealing ring 25 and may be locked in closed position by means of the latches 20a. The upper end of the housing 14 is provided with a hollow cap piece 22 in which are mounted the radially slidable latch bolts 23 which are held in withdrawn position by means of a spring 25'. Depending from the cover 20 at the center is a cylindrical member 24 which has an inturned flange 24a at its bottom positioned so that when the cover is closed and the machine is started the latch pins 23 will fly outwardly under centrifugal force so as to be in the path of movement of the flange 24a to prevent the cover from being opened while the machine is in operation.

The cover is provided with a vacuum-relief valve 26 which is normally held in closed position by a spring 26a and all of which is housed within a perforated casing 26b. In the operation of the apparatus at times there may be a tendency for the creation of a vacuum within the sealed casing 18, subjecting it to considerable strain due to atmospheric pressure thereon. For this reason the valve 26 is provided to permit of the entrance of air into the casing if the pressure therein falls too low.

Figures 14, 15, 16, 17, 18, 19:
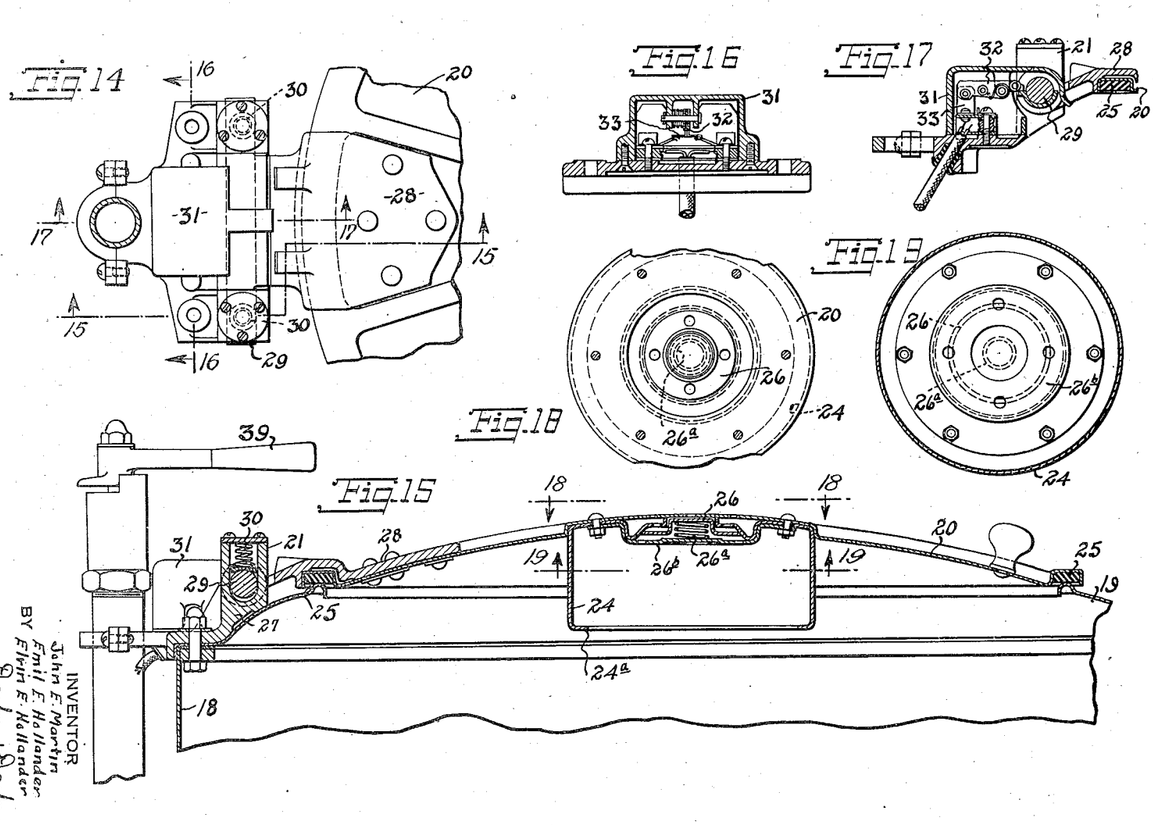
Fig. 14 is an enlarged fragmentary view, taken from Fig. 4.
Fig. 15 is a section on line 15—15 in Fig. 14.
Figs. 16 and 17 are sections on lines 16—16 and 17—17, respectively in Fig. 14.
Fig. 18 is a plan view taken from the line 18—18 in Fig. 15.
Fig. 19 is a section on the line 19—19 in Fig. 15.

As seen clearly in Figs. 14 and 15, the hinge 21 comprises a supporting member 27 secured to the casing 18 and in turn supporting the leaf 28 of the hinge upon a shaft 29 journalled therein so as to permit vertical sliding movement against the action of spring 30. As will be apparent, the purpose of this structure is to permit of the relatively large cover properly sitting on the bead around the opening of the ring 19 as it is closed. In bringing the cover down the sealing ring 25 adjacent the hinge strikes first and as the cover is completely closed the shaft 29 is raised against the action of spring 30. This insures a tight seal around the entire opening. A safety switch is enclosed within the housing 31 and operated by this hinged structure to prevent the operation of the motors K and J while the cover is open. The details of construction of this switch are clear from Figs. 16 and 17. An arm 32 is pivotally mounted therein and has an extension under the shaft 29 at one end, and its other end is provided with a contact finger 33 to engage a pair of fixed contacts in the motor control circuits. When the cover is open this switch is open, and when it is closed the switch is closed.

Figures 8, 9, 10, 11, 12, 13:
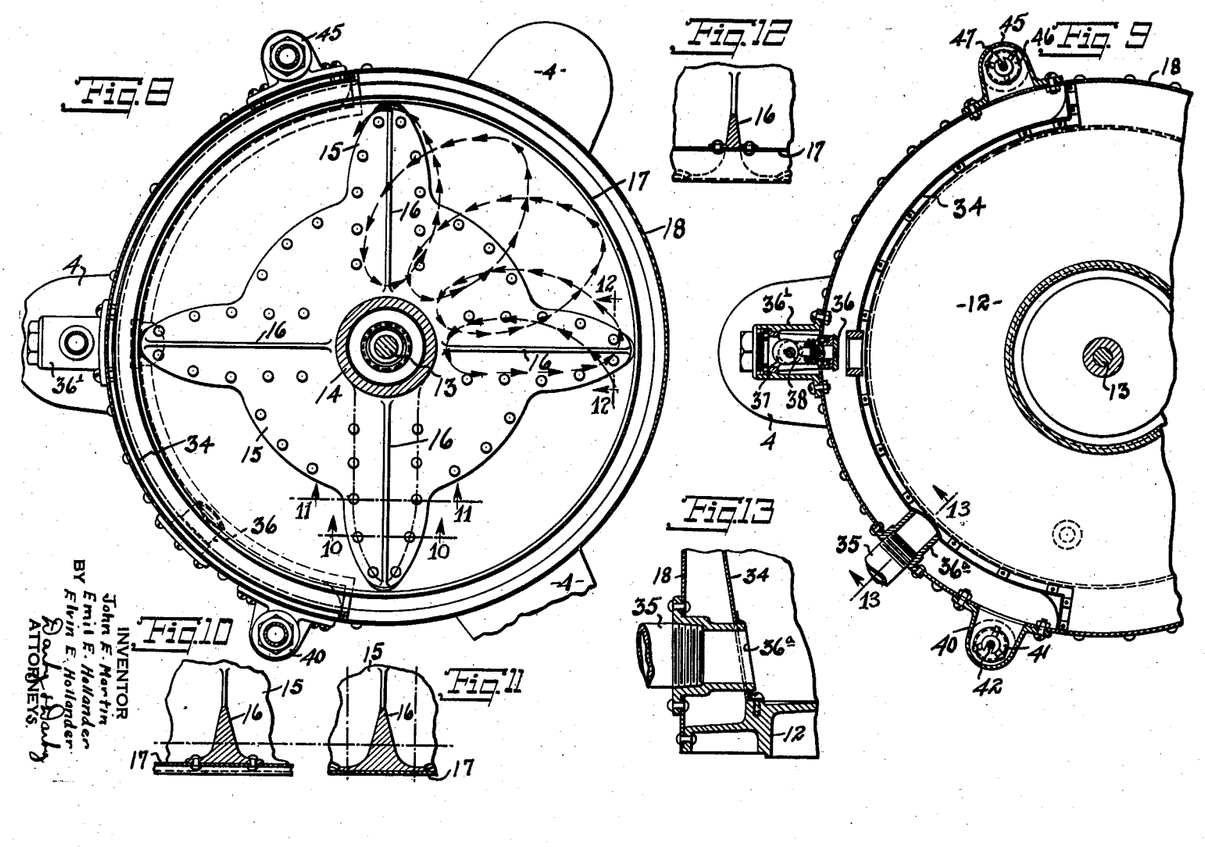
Fig. 8 is a section on line 8—8 in Fig. 1.
Fig. 9 is a section on line 9—9 in Figs. 1 and 3.
Figs. 10, 11 and 12 are sections on lines 10—10, 11—11 and 12—12, respectively, in Fig. 8.
Fig. 13 is an enlarged sectional view, taken on the line 13—13 in Fig. 9.

Within the casing 18 and extending for approximately half of the circumference thereof is an inner wall 34, which is best seen in Figs. 8 and 9. This wall provides a compartment which may be isolated from the chamber formed by the casing 18 by means of control valves, as will be described. As shown in Fig. 13, a coupling member 36a provides means for attaching a fluid-supply pipe 35 to the casing 18 to deliver the cleaning fluid thereinto without introducing any of the liquid into the space or chamber set off by the wall 34. When the valves are properly set for this operation, as will be described later, cleaning fluid is introduced into the casing 18 and the level rises until it reaches the top of the wall 34, after which it flows thereover down into the chamber which this wall forms. The liquid is then removed from this chamber through a valve to be described.

Figure 1:
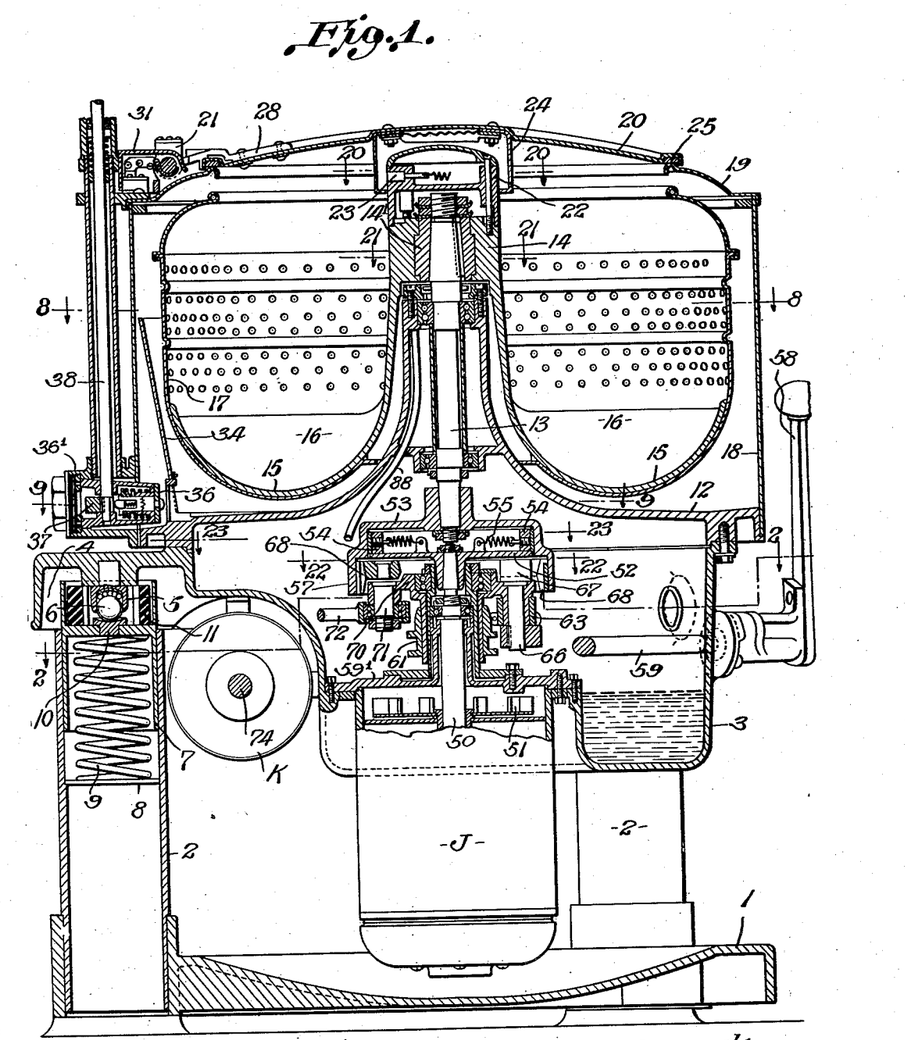
Figure 1 is an elevational, sectional view, the section being taken on the line 1—1 in Fig. 4.
Figures 2, 4:
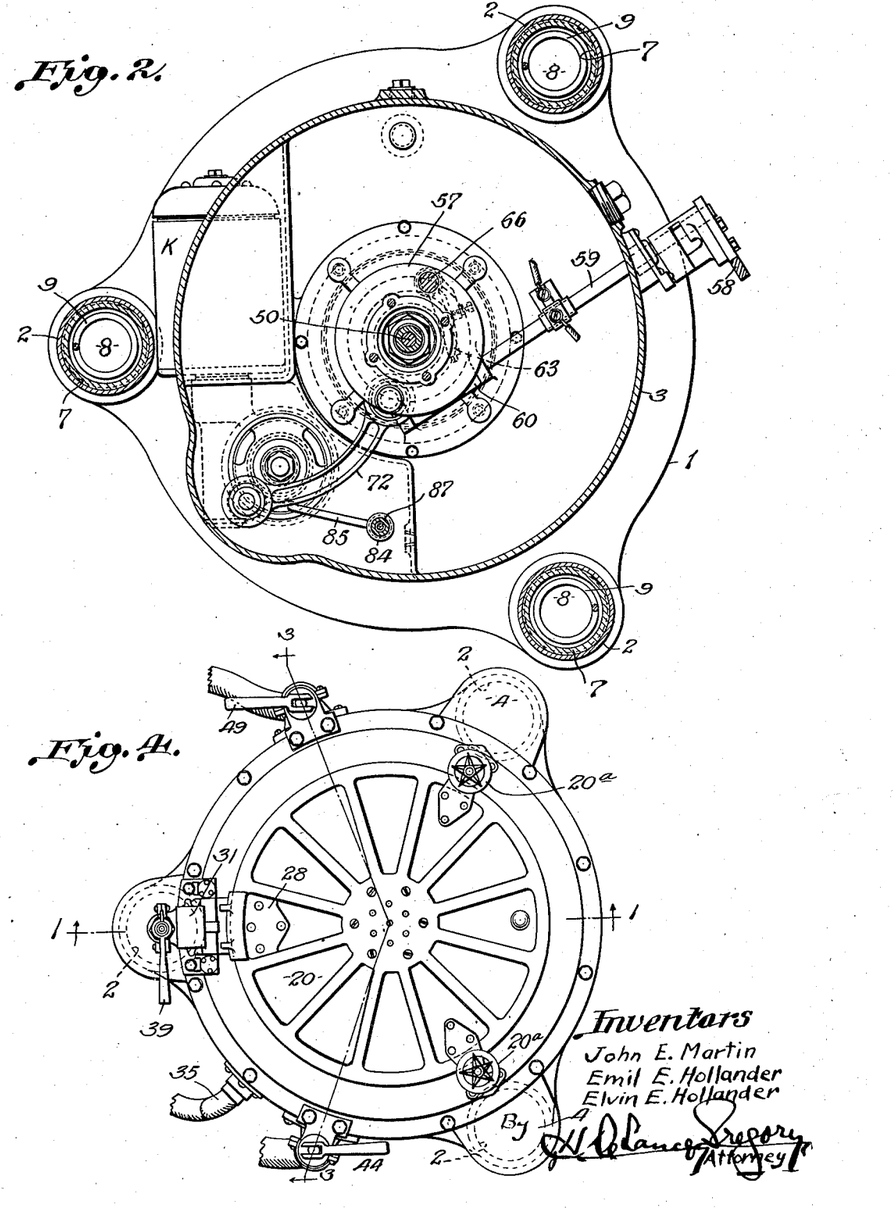
Fig. 2 is a section on the line 2—2 in Fig. 1.
Fig. 4 is a plan view.

The wall 34 has an opening therein, as shown in Figs. 1 and 9, for example, which is controlled by a valve 36 slidably mounted in a housing 36' and operated by means of the cam 37 upon the vertical shaft 38. This shaft extends upwardly through a tubular casing and terminates in an operating handle 39 clearly seen in Fig. 4. It is the valve 36 which makes it possible to connect the space within casing 18 with the space behind wall 34 or to isolate them. As shown in Fig. 9 the casing 18 is provided with a pair of valves within valve casings 40 and 45. The construction of these valves within valve casings 40 and 45 is clear in Fig. 3. Within the casing 40 is a valve 41 connected to a valve stem 42 which is pivotally connected to a vertically slidable rod 43, which in turn is pivotally connected at its upper end to a lever 44 having cam-shaped ends which rest on top of the valve housing.

In a similar way within the casing 45 is a valve 46 connected to a valve stem 47, pivotally connected extension 48 and the operating cam handle 49. Springs are provided to cause the valve to tend to seat to the position shown in Fig. 3. When the handles 44 and 49 are rotated, they may raise and lower the valves to open and close them.

It is the motor J which imports continuous rotation to the basket. It is supported from the casing 3, into which its power shaft 50 extends. This shaft is in longitudinal alignment with the drive shaft 13 upon which the basket is mounted. Shaft 50 is provided with a cooling fan 51 for the motor J in accordance with well known practice. Secured to the lower end of shaft 13 is a clutch drum or transmission member 53 having a depending clutch skirt or annular flange 57. Secured to the upper end of shaft 50 and locked thereon is a disc 52 provided with four equally spaced and properly shaped guides 56 between which rest the arcuate brake shoes 54. These shoes are pulled radially toward the center by means of springs 55. When the basket is to be rotated by the motor J the brake shoes 54, which are provided with the usual brake lining, are thrown outwardly by centrifugal force to engage the inner wall of the drum 53 so that shafts 50 and 13 are directly locked together and the basket is driven at motor speed.

Figure 5:
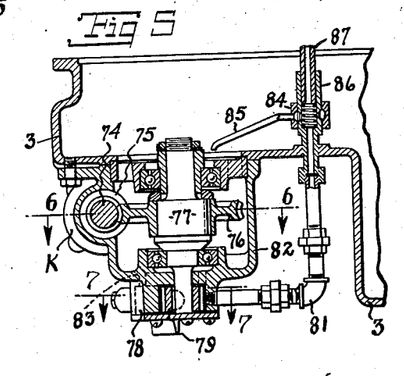
Fig. 5 is a section on line 5—5 in Fig. 3.
Figures 6, 7:
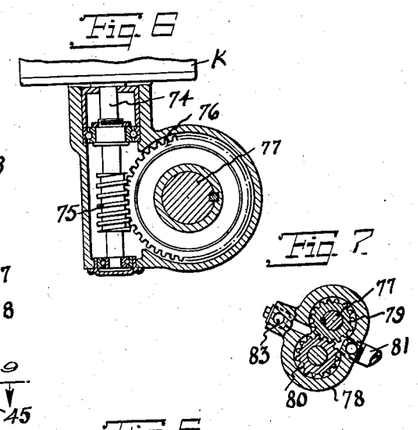
Fig. 6 is a section on line 6—6 in Fig. 5.
Fig. 7 is a section on line 7—7 in Fig. 5.
Figures 20, 21, 22, 23, 24, 25, 26, 27:
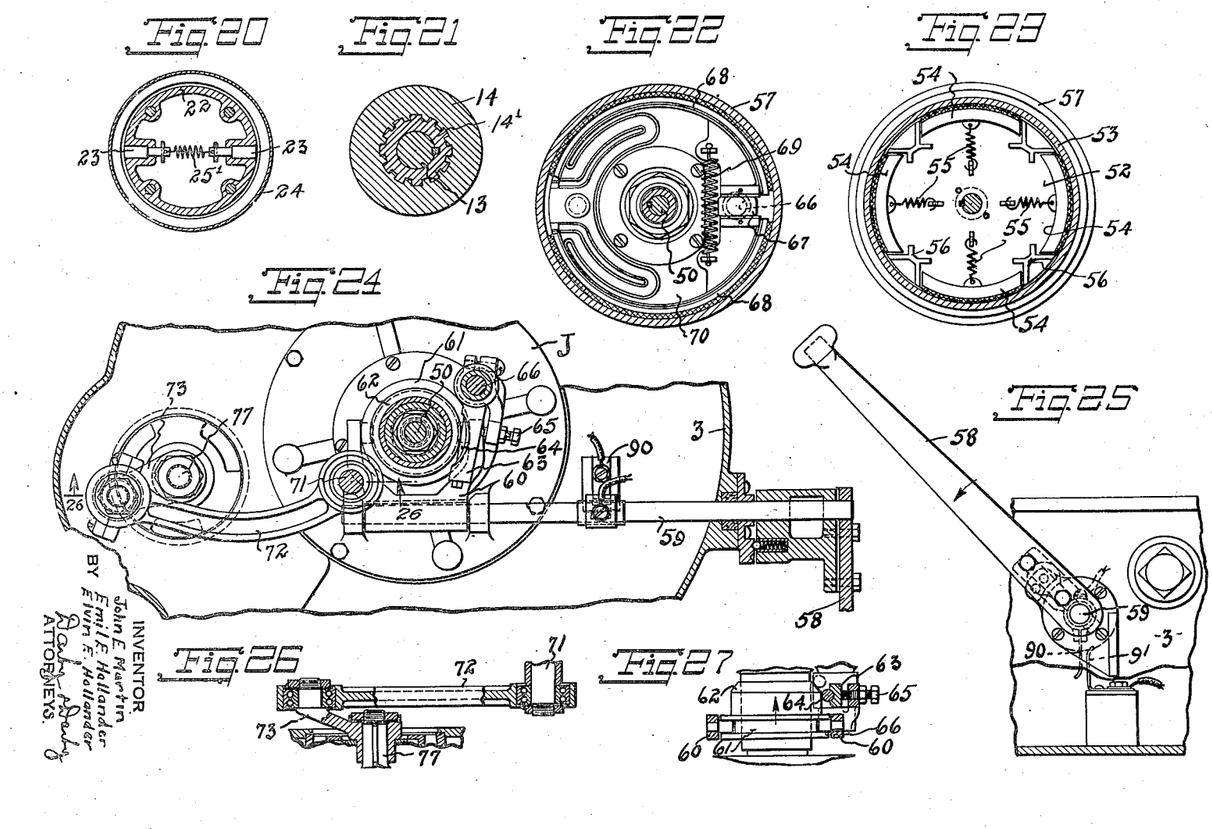
Figs. 20, 21, 22 and 23 are enlarged sectional views taken on the lines 20—20, 21—21, 22—22 and 23—23, respectively, in Fig. 1.
Fig. 24 is an enlarged section on line 24—24 in Fig. 3.
Fig. 25 is a side elevational view, looking toward the left in Fig. 24.
Fig. 26 is a section on line 26—26 in Fig. 24.
Fig. 27 is a detail sectional view.

The oscillatory movement of basket 17 is accomplished through an operating mechanism from motor K. The operating mechanism is controlled by the lever 58 and the shaft 59 which is journalled in the housing 3 and a bracket on the plate 59' by which motor J is supported from that housing. Mounted upon the end of shaft 59 is a yoke 60 having pins at the ends of its arms which lie in the groove of collar 61. Formed with this collar is a cam surface 62 which cooperates with the round contact rod 64 mounted in an arm 63 pivotally supported by the shaft 66 and adjusted in its outward limit of movement by means of the set screw 65. The shaft 66 extends upwardly and is provided at its upper end with a cam 67 as shown in Figs. 1 and 22. This cam 67 is mounted between the ends of the clutch shoes 68 which are of the shape shown in Fig. 22 to give them the proper springiness so that when the cam is rotated from the position shown the substantially semi-circular shoes will move at all points in a radial direction. A spring 69 interconnects these shoes and resists their outward movement by means of the cam 67. The usual brake lining is employed so that when the shoes are expanded they grip the inner wall of the skirt 57. The arm 63 and the shaft 66 are supported upon a disc 70 which has a depending cylindrical portion as shown in Fig. 1 upon which the grooved collar 61 is mounted. The disc 70 is provided with a short pin shaft 71 to which is pivotally secured a link 72, which link, in turn, is pivotally connected to a pin on the crank 73, as shown in Figs. 24 and 26. The crank 73 is secured to a shaft 77, which shaft is journalled in a depending housing 82 supported from the casing 3, as shown in Fig. 5. Within the housing 82 and keyed to the shaft 77 is a worm-wheel 76 which meshes with the worm 75 on the shaft 74 of motor K.

Figure 3:
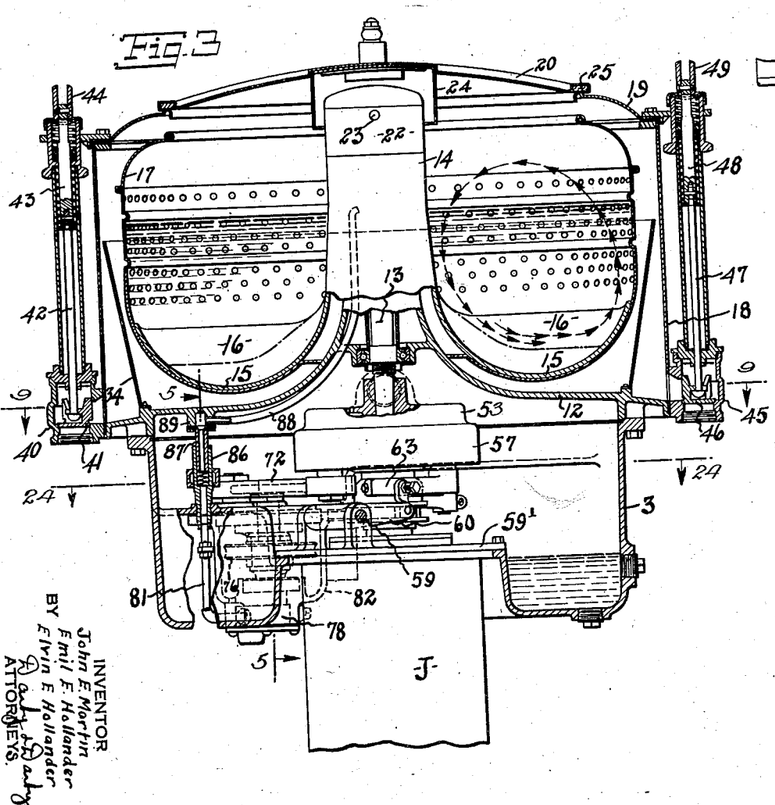
Fig. 3 is a section on line 3—3 in Fig. 4.

Mounted below the housing 82 and formed as a part thereof is a smaller housing 78 within which a small gear type pump is enclosed. The gear 79 of this pump is keyed to the lower end of shaft 77 and meshes with the idler gear 80. The pipe 81 is connected to the discharge end of the pump and the opening 83 connects the inlet of the pump with the bottom of the housing 82. The pipe 81 extends upwardly through the housing 3 in the fitting 86 which has openings through the wall thereof into a grooved ring 84 to which is connected a length of pipe 85 which terminates over the bearings of shaft 77. Slidably mounted within the fitting 86 and resting upon a coil spring is a nipple 87 having a flanged upper end which seats against a hollow boss 89 on the bottom of the cover 12, as shown in Fig. 3. When the cover is mounted in place the parts 89 and 87 associate to form a tight seal through the agency of the spring. A suitable gasket is employed, as indicated in Fig. 3. The boss 89 is connected by a pipe 88 which leads up into the main bearing for the basket, as shown in Fig. 1, so as to discharge oil thereover. The oil trickles down through the upper bearing onto the lower bearing and from there back into the sump in casing 3. The oil also is discharged from pipe 85 over the bearings of the shaft 77 and back into the bottom of casing 82 and from there to the intake of the pump through the passage 83.

To effect oscillation of the basket, motor K is energized, causing it to continuously revolve. As will be apparent to those skilled in the art, the disc 70 will be given an oscillatory movement by reason of the crank and link connection thereto. The oscillatory movement of disc 70 is transmitted to the skirt 57 and hence to shaft 13 and basket 17 by rotating lever 58 so that the fork 60 thereon raises the collar 61 and its cam surface 62. The upper movement thereof causes the outer movement of lever 63 and the rotation of cam 67, spreading the clutch shoes 68 so that they grip the skirt.

The lever 58 and the clutch controlled thereby may be employed as a brake to stop the basket when the motor J is deenergized. Thus when the motor J is deenergized if the clutch handle is moved to cause the clutch shoes 68 to grip the skirt 57 it will be apparent that the basket may be quickly brought to a stop.

As indicated, for example, in Fig. 25, the shaft 59 is provided with a contact finger 90 positioned to engage and disengage the fixed contact finger 91, which fingers may be included in the control circuit for the motor J so that when the basket is being oscillated by motor K it will be impossible to energize motor J. The manner of using this switch for this purpose will be obvious to those skilled in the art.

In a broad sense the present apparatus works most efficiently with a chlorinated solvent such as carbon tetrachloride, but it may be used with petroleum base solvents such as naphtha, benzine, and the like. The machine as constructed may employ three separate and distinct fluids. These fluids may be a solvent cleaning or filter fluid, a soap cleaning fluid and a rinsing fluid. The soap fluid is preferably a special combination of liquid soap and cleaning fluid. The rinse fluid may be considered as a batch of clean distilled filter fluid.

As a preliminary to a detailed description of the possible operation of the machine it is helpful to first note the procedure in a general way.

In the cleaning of heavy materials such as woolens and almost all materials of dark color, only the solvent cleaning or filter fluid is used. In the cleaning of lighter materials both in weight and in color, such as silks, rayons and the like, the filter fluid, the soap fluid and the rinse fluid are preferably used. The general procedure with regard to a batch of garments or fabrics requiring the use of three fluids comprises loading a batch of fabric into the basket 17. The filter fluid is then admitted to the tub, as will be described in detail later, and the basket oscillated to drive the fluid through the fabrics and remove the dirt and grease therefrom. At the end of this period the fluid is allowed to drain from the tub and the basket is then given continuous rotary motion at a speed of approximately 900 R. P. M. to dry the batch. At the end of this extraction period the soap fluid is admitted to the tub and the fabrics are again agitated by oscillation of the basket, for a predetermined period of time. The soap fluid is then pumped from the tub and the fabrics are again extracted by rotation of the basket. The rinse fluid is then admitted to the tub and the fabrics agitated therein by oscillation of the basket. At the end of the rinsing period the rinse fluid is pumped from the tub. The fabrics are then fully dried by rotation of the basket as before, and then removed therefrom, thoroughly cleaned and dried articles.

The various detailed manipulations of the valves and other parts of the machine will now be given in order to carry out the general procedure briefly explained above.

In order to provide the base from which to start it will be assumed that all valves on the machine are closed. Filter fluid is admitted into the inner tub by way of the supply connection 35. The valve 46 is opened. The filter fluid going into the inner tub will build up to the level of the top of the partition of the inner tub. At this level the fluid spills over into the outer tub and falls by gravity through valve 46.

The next step is to set the basket, which is loaded with fabrics to be cleaned, into oscillation. The motor K is energized and the clutch lever 58 is operated to interconnect the motor and the basket through the clutch mechanism previously described. At the end of a predetermined period, the supply circuit to motor K is opened, bringing the motor and basket to a stop. This period is determined by experience, and of course depends upon the nature of the cleaning fluid and the fabrics, as well as the extent to which they are soiled.

The cleaning or filter fluid is then removed from the tub by opening valve 36, permitting the fluid to drain from the bottom of the inner tub into the outer tub, and thence out through the open valve 46. When the tub is completely empty the garments are dried by rotating the entire tub or basket. Clutch lever 58 is operated to disengage the clutch if this has not already been done, and motor J is energized which causes the basket to rotate continuously for a period of time as might be desired.

When the motor J shuts off the clutch lever 58 may be operated as previously described to act as a brake to bring the basket to a quick stop when desired. If the batch of garments or fabrics in the basket is of such a nature that it is not desired or necessary to subject them to further cleaning operations, they may be removed as clean, finished articles. However, if the nature of the batch is such as to make it desirable to subject them to cleaning operations with the soap fluid and the rinse fluid, the next step is to close valve 46 and introduce the soap fluid into the tub by way of the connection 35.

The basket is then set in oscillation by the operation of motor K and clutch lever 58 as before. At the end of the washing period, the motor K is stopped and the clutch lever 58 returned to its first position. The fluid is removed from the tub by opening valves 36 and 41.

The motor J is now operated to revolve the basket in a continuous rotation so as to extract the remainder of the soap fluid from the garments. Here again the garments may now be removed from the apparatus if they are of such a nature as not to require any rinsing operation.

On the other hand, if it is desired to rinse the fabrics an operation similar to that with the soap fluid is carried out.

Valves 36 and 41 are closed, the tub is filled with the rinse fluid through the connection 35, and the basket set in oscillation as before. At the end of the rinsing period, valves 36 and 41 are opened to drain the fluid from the tub. The basket is again set into continuous rotation to extract the fluid in the garments. The garments are now removed from the basket in a thoroughly cleaned, rinsed and dried condition.

The particular structure disclosed is of major importance since it has been found by actual experience that fabrics are more rapidly and thoroughly cleaned by means of this apparatus than has been heretofore possible. For example, in the best practice heretofore known, it takes from twenty minutes to an hour to thoroughly clean a batch of fabrics, whereas with the machine of this invention the average time is of the order of seven minutes, which, followed up by two or three minutes of extraction, results in the fabrics being thoroughly cleaned and dried.

The ability of both cleaning and extracting in the same machine is in a large measure facilitated by the manner of mounting the tub. This tub is fully floating on the spring and ball supports so that very high speeds of operation may be effected, especially during the extracting operation. The basket of this machine normally operates at approximately 900 revolutions per minute, which is only possible because of the particular form of mounting and because of the fact that the fabrics evenly distribute their mass within the basket during the cleaning operation. It will be noted that the tub is permitted, by reason of the structure of its support, both vertical movement and movement in any direction in a horizontal plane.

From the above description it will be apparent that this invention resides in certain principles of construction and operation which may be embodied in other physical forms and carried out in other ways without departing from the scope thereof. It is not desired therefore to be strictly limited to the disclosure as given for purposes of illustration, but rather to the scope of the appended claims.

It is claimed:

1. In laundry apparatus of the character described, a basket supported for rotary movement, a drive shaft and a power shaft disposed in end-to-end alignment with each other and rotatable about a common axis independently of and relatively with respect to each other, means connecting said drive shaft to said basket, means for rotating said power shaft continuously in one direction, means disposed at and associated with the adjacent ends of said shafts for connecting said drive shaft to said power shaft for rotation with the latter, said last-named means comprising a clutch drum fixed to said drive shaft and means disposed within said drum and fixed for rotation with said power shaft and movable by centrifugal force into engagement with the adjacent inner surface of said drum, means for imparting oscillatory movement to said drive shaft about said axis and comprising a clutch part moveable into and out of engagement with said drum, means for oscillating said clutch part, and control means for moving said clutch part into and out of engagement with said drum.

2. In laundry apparatus of the character described, a basket supported for rotary movement, a drive shaft and a power shaft disposed in alignment with each other and rotatable about a common axis independently of and relatively with respect to each other, means connecting said drive shaft to said basket, means for rotating said power shaft continuously in one direction, means disposed at and associated with the adjacent ends of said shafts for connecting said drive shaft to said power shaft for rotation with the latter, said last-named means comprising a clutch drum provided with an anular flange and fixed to said drive shaft, and shoes disposed within said drum and fixed for rotation with said power shaft and movable by centrifugal force into engagement with the adjacent inner surface of said drum, means for imparting oscillatory movement to said drive shaft about said axis and comprising a clutch shoe disposed within said flange and moveable into and out of engagement with the adjacent surface thereof, means for oscillating said clutch shoe, and control means for moving said clutch shoe into and out of engagement with said flange.

3. In laundry apparatus of the character described, a basket supported for rotary movement, a drive shaft and a power shaft rotatable independently of and relatively with respect to each other, means connecting said drive shaft to said basket, a motor for rotating said power shaft continuously in one direction, a transmission member connected to said drive shaft, means for connecting said member to said power shaft for rotation thereby, an element supported for oscillatory movement, a second motor for oscillating said element, and means for connecting said member to said element for oscillatory movement therewith, said member being in the form of a clutch drum fixed to said drive shaft and enclosing said second-named means and said element.

4. In laundry apparatus of the character described, a basket supported for rotary movement, a drive shaft and a power shaft rotatable independently of and relatively with respect to each other, means connecting said drive shaft to said basket, a motor for rotating said power shaft continuously in one direction, a transmission member connected to said drive shaft, means responsive to centrifugal force developed upon rotation of said power shaft and operable under such force to connect said member to said power shaft for rotation thereby, an element supported for oscillatory movement, a second motor for oscillating said element, and means for connecting said member to said element for oscillatory movement therewith, said member being in the form of a clutch drum fixed to said drive shaft and enclosing said second-named means and said element.

5. In laundry apparatus of the character described, a housing, a motor disposed below and supported from said housing, a vertically disposed power shaft driven directly from said motor and extending upwardly through the bottom of said housing into the interior thereof, a drive shaft disposed above and in alignment with said power shaft for rotation about the axis of rotation of said power shaft, a basket connected to said drive shaft for movement therewith, means disposed at and associated with the adjacent ends of said shafts for connecting said drive shaft to said power shaft for rotation with the latter, said power shaft for rotation with the latter, means for imparting oscillatory movement to said drive shaft, means for controlling said last-named means and including a control shaft journalled in and extending into said housing from the exterior thereof, and means for rotating said control shaft into and out of the control position thereof.

6. In laundry apparatus of the character described, a housing, a motor disposed below and supported from said housing, a vertically disposed power shaft driven directly from said motor and extending upwardly through the bottom of said housing into the interior thereof, a drive shaft disposed above and in alignment with said power shaft for rotation about the axis of rotation of said power shaft, a basket connected to said drive shaft for movement therewith, a second motor disposed below and supported from said housing, means disposed at and associated with the adjacent ends of said shafts for connecting said drive shaft to said power shaft for rotation with the latter, and means driven from said second motor for imparting oscillatory movement to said drive shaft; said last-named means including a crank driven by said second motor, a clutch member rotatable about said axis and relatively with respect to said shafts, a second clutch member fixed for rotation with said drive shaft and disposed for engagement by said first-named clutch member, a link connecting said crank and said first-named clutch member, and means for effecting engagement and disengagement of said clutch members.

7. In laundry apparatus of the character described, a housing, a motor disposed below and supported from said housing, a vertically disposed power shaft driven directly from said motor and extending upwardly through the bottom of said housing into the interior thereof, a drive shaft disposed above and in alignment with said power shaft for rotation about the axis of rotation of said power shaft, a basket connected to said drive shaft for movement therewith, a second motor disposed below and supported from said housing, means disposed at and associated with the adjacent ends of said shafts for connecting said drive shaft to said power shaft for rotation with the latter, clutch means driven from said second motor for imparting oscillatory movement to said drive shaft, and means for controlling said clutch means; said control means comprising a collar disposed about said power shaft and slideable axially thereof and provided with a cam surface, means for actuating said collar, and means engageable with said cam surface and operable by virtue of such engagement to effect clutching action of said clutch means.

JOHN E. MARTIN.
EMIL E. HOLLANDER.
ELVIN E. HOLLANDER.